United States Patent [19]

Remboski, Jr. et al.

[11] Patent Number: 5,400,644
[45] Date of Patent: Mar. 28, 1995

[54] KNOCK DETECTION SYSTEM

[75] Inventors: Donald J. Remboski, Jr., Northborough, Mass.; Steven L. Plee, Brighton, Mich.; David Frankowski, Woodhaven, Mich.; Alan Benstead, Walled Lake, Mich.

[73] Assignee: Motorola, Inc., Schaumburg, Ill.

[21] Appl. No.: 953,428

[22] Filed: Sep. 29, 1992

[51] Int. Cl.⁶ .............................. G01L 23/22
[52] U.S. Cl. ...................... 73/35; 364/431.08
[58] Field of Search ............ 73/35; 364/431.08; 123/425

[56] References Cited

U.S. PATENT DOCUMENTS

| | | | |
|---|---|---|---|
| 4,344,318 | 8/1982 | Düdeck et al. | 73/35 |
| 4,345,558 | 8/1982 | Yamaguchi et al. | |
| 4,364,260 | 12/1982 | Chen et al. | 73/35 |
| 4,373,378 | 2/1983 | Fukishiro et al. | |
| 4,455,862 | 6/1984 | Takeuchi | |
| 4,467,634 | 8/1984 | Rohde et al. | 73/35 |
| 4,508,079 | 4/1985 | Komurasaki | |
| 4,637,247 | 1/1987 | Dreyer et al. | |
| 4,846,130 | 7/1989 | Jensen | |
| 4,856,480 | 8/1989 | Nakajima et al. | |
| 4,881,401 | 11/1989 | Cockerham | |
| 4,943,776 | 7/1990 | Polito et al. | 73/35 |
| 4,991,553 | 2/1991 | Kurihara | |
| 5,092,160 | 3/1992 | Ueda et al. | |
| 5,115,779 | 5/1992 | Itoyama | 73/35 |
| 5,146,777 | 9/1992 | Polito et al. | 73/35 |

FOREIGN PATENT DOCUMENTS

3911554 10/1990 Germany .

Primary Examiner—Hezron E. Williams
Assistant Examiner—Helen C. Kwok
Attorney, Agent, or Firm—Nicholas C. Hopman

[57] ABSTRACT

A system for detecting the presence of a knock condition by interpreting a broadband spectra signal as measured from an internal combustion engine is described. The system includes a spectra measurement device, preferably an accelerometer (101) mounted to an engine for providing a broadband spectra signal (103) to a knock detector (105). Preferably the knock detector (105) is based on a digital signal processor. The signal (103) is provided simultaneously to knock discrimination elements (405, 409, and 413), that provide a knock spectra signal (415) representative of the average energy within a predetermined knock spectra, and noise discrimination elements (417, 421, and 425), that provide a noise spectra signal (427) representative of average energy within a predetermined noise spectra. The knock spectra signal (415) is combined with the noise spectra signal (427) to provide a knock signal (431) when an engine knocking condition is detected.

8 Claims, 13 Drawing Sheets

KNOCK DETECTION SYSTEM

FIELD OF THE INVENTION

This invention is related to the field of knock detection within an internal combustion engine, and more specifically to a system for extracting an accurate representation of an engine knock signal from a broadband spectra provided by an engine mounted vibration sensor.

BACKGROUND OF THE INVENTION

Engine control systems with knock detection capability, are used to detect and eliminate knocking conditions, characteristic of the operation of internal combustion engines. Eliminating a knocking condition is important because, left unchecked engine power and efficiency will suffer, and combustion chamber and spark plugs will be damaged.

Knock detection systems typically use an accelerometer based sensor mounted on an engine for converting engine vibration into an electrical signal. This electrical signal includes a broad spectra of information about the engine's operating condition. Included in this signal is the knock information, and extraneous information known as noise. When knocking occurs, the knock component of the signal results from gas oscillations in the combustion chamber during combustion. The noise component of the signal generally is significant and can be large enough to mask the knock component. The noise component may be comprised of several sources including piston slap vibration, valve closing vibration, and other systemic noise.

Various techniques have been applied to extract the knock information from the electrical signal representative of engine vibration, however, these techniques have been limited in accuracy and reliability. The knock component of the signal varies considerably in magnitude and frequency over the full operating range of the engine. This partially is related to, gas temperature, and combustion chamber geometry. Moreover, there are variations from engine to engine and from cylinder to cylinder within the same engine that affect the relationship of the knock component to the noise component.

To provide for this range of conditions, typically knock detection schemes use a broadband bandpass filter to extract knock information from the broadband electrical signal. Some schemes include engine crank angle based windowing, to restrict the analysis of knock to when it could likely occur in the combustion cycle. Other schemes attempt to improve the signal-to-noise ratio of the measurement by employing a second, or noise, bandpass filter having a passband located distant to the passband of the knock bandpass filter. The output of this noise bandpass filter is then subtracted from the output of the knock bandpass filter. The concept here is that the noise bandpass filter will indicate the level of noise signal located apart from the knock bandpass filter. This assumes that noise is broadband, and that the noise component in the knock band is of substantially the same magnitude. Thus, by subtracting the output of the noise bandpass filter from the output of the knock bandpass filter a more accurate representation of the knock component may be obtained.

This scheme is defective for several reasons, including that the filters intrinsically have a phase delay error. When the noise is subtracted this error detracts from accurately canceling the noise component of the signal. Further, since the noise band is located apart, only the noise located apart from the characteristic knock frequencies can be detected. In fact, the noise is not really broadband and there can be substantial noise located close to the characteristic knock frequencies that will not be canceled in this scheme. Also, with present schemes, extensive calibration is required to determine for each engine time a characteristic knock frequency, and if used, appropriate crank angle window, and a knock threshold. Additionally, as the engine speed increases, the systemic noise content increases substantially, and current systems perform inadequately. Finally, in these schemes the knock detection threshold is not adjusted with sensor gains and system aging.

To further improve accuracy some systems use a multi-cycle averaging technique. Because of the dynamic characteristic of combustion within the combustion chamber, the knock component has a random behavior and therefore multi-cycle averaging works poorly.

What is needed is an improved system for detecting knock in internal combustion engines that is more reliable, and accurate, can detect knock at high engine speeds, requires minimum calibration and can be easily applied to different engine families.

DETAILED DESCRIPTION OF A PREFERRED EMBODIMENT

In a preferred embodiment a system for detecting the presence of a knock condition by interpreting a broadband spectra signal as measured from an internal combustion engine is described. The system includes a spectra measurement means for providing a broadband spectra simultaneously to a knock discrimination means, that provides a knock spectra signal representative of the average energy within a predetermined knock spectra, and a noise discrimination means, that provides a noise spectra signal representative of average energy within a predetermined noise spectra. The knock spectra signal is combined with the noise spectra signal to provide a knock signal when an engine knocking condition is detected. This system does this in real time during a singular combustion event. This avoids any inaccuracy due to multi-cycle averaging, or due to the characteristically random behavior of the knock spectra signal.

Figures 1, 4:
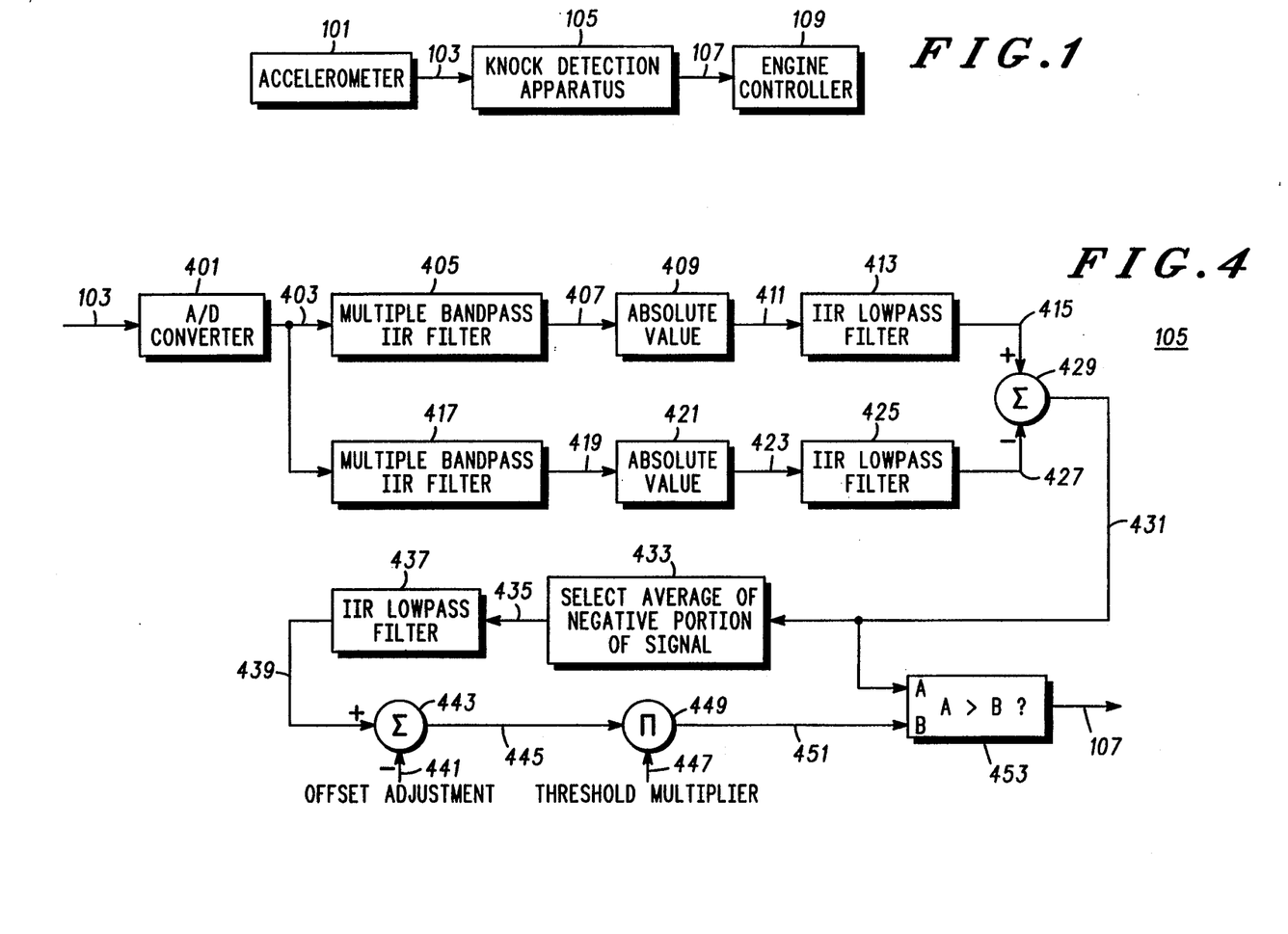
FIG. 1 is a block diagram of a knock detection system, in accordance with the invention.
FIG. 4 is a block diagram, further illustrating the details of the knock detection apparatus block shown in FIG. 1

FIG. 1 is a system block diagram depicting the general configuration of a knock detection system. An engine mounted spectra measurement means, in this case an accelerometer 101, derives a broadband spectra signal 103, indicative of a broadband spectra vibration characteristic of the engine. This broadband spectra signal 103 is provided to a knock detection apparatus 105. If a knocking condition is detected the knock detection apparatus 105 will provide a knock logic signal 107 to an engine controller 109. This knock logic signal 107 is provided to the engine controller 109 to control, or eliminate the knocking of the engine. Of primary interest in this system, is the knock detection apparatus 105, which is detailed below.

Figure 2:
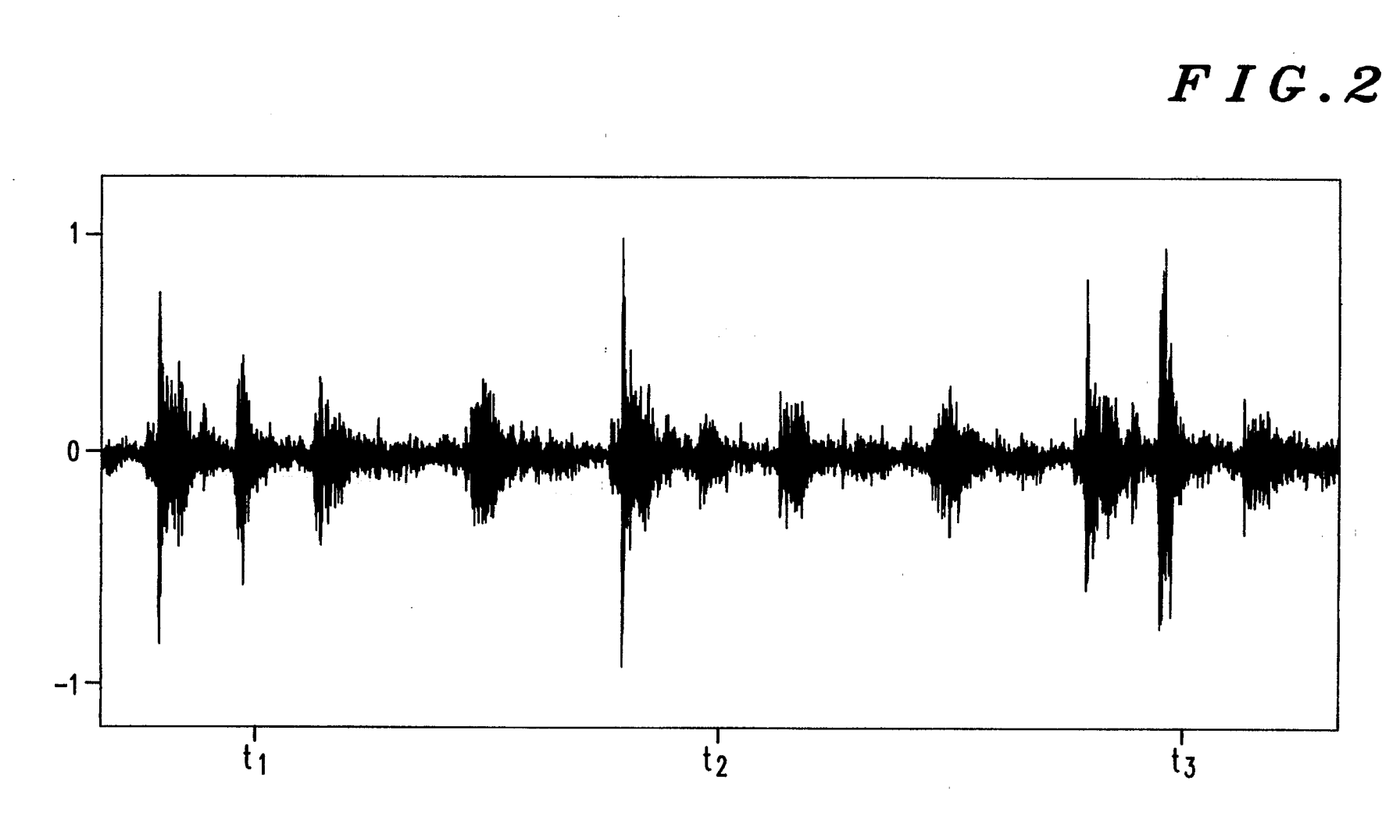
FIG. 2 is a chart representing a broadband spectra signal, derived from an accelerometer as described in the preferred embodiment.

FIG. 2 is a chart representing the broadband spectra signal 103, derived from the accelerometer 101. This is shown for three consecutive cylinder firings corresponding to $t_1$, $t_2$, and $t_3$. Note that in the charts that follow the time reference marks are $t_1$, $t_2$, and $t_3$ used to indicate synchronicity with this broadband spectra signal 103. As described earlier, this electrical signal includes a broadband spectra of information about the engine's operating condition. Included in this signal is knock spectra information, and extraneous spectra information known as noise.

Figure 3:
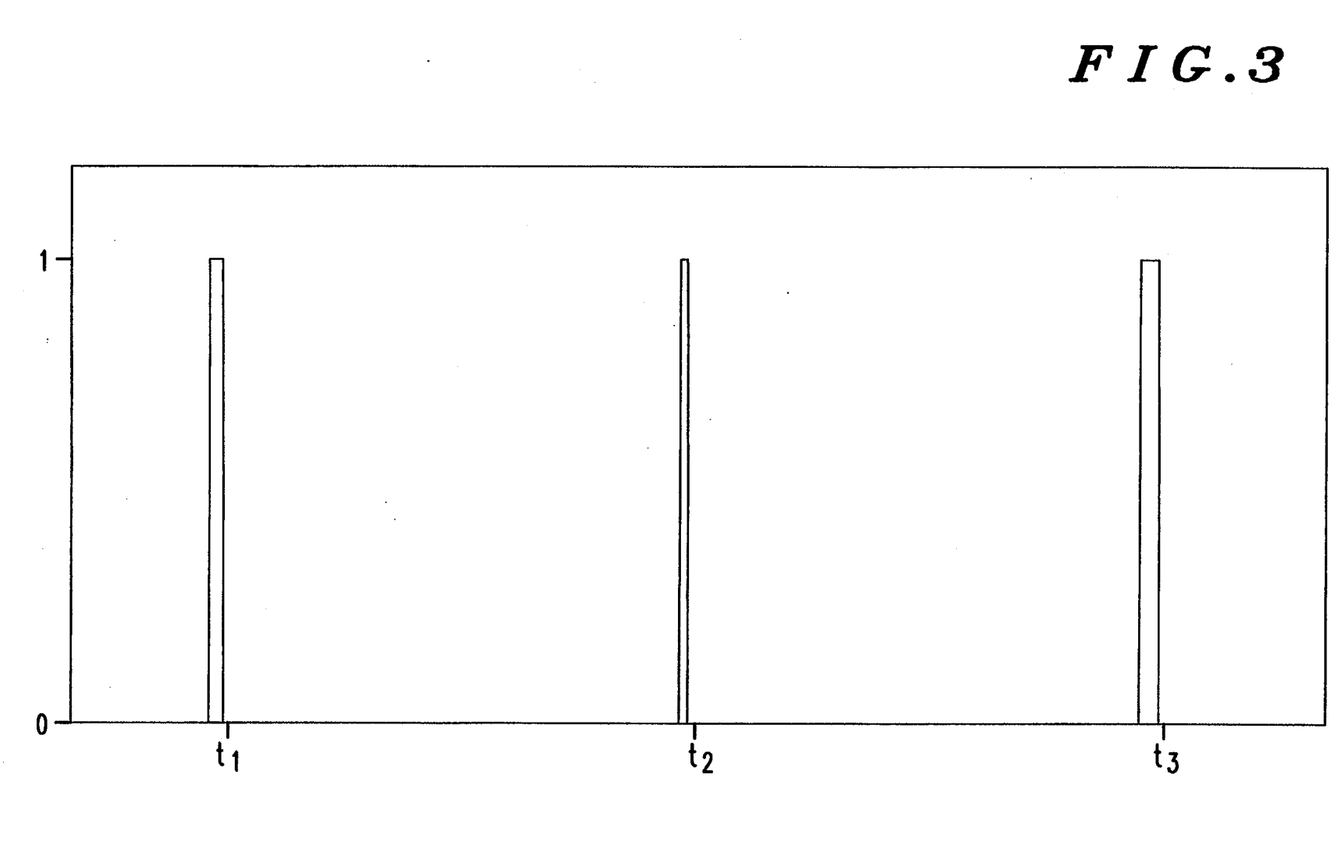
FIG. 3 is a chart representing a knock logic signal extracted by a knock detection apparatus, as described in the preferred embodiment.

FIG. 3 is a chart representing the knock logic signal 107, as detected by the knock detection apparatus 105. In this chart three successive knock events are detected and shown. Next, the details of the knock detection apparatus 105 will be revealed.

FIG. 4 is a block diagram that further illustrates the details of the knock detection apparatus 105.

In the preferred embodiment the knock detection apparatus 105 is shown using discrete time signal processing elements. Alternatively, those skilled in the art will recognize other equivalent embodiments such as those using conventional continuous time signal processing elements, such as analog elements. Discrete time signal processing was chosen because of the benefits it has over continuous time signal processing elements. These benefits include fewer components, stable deterministic performance, no aging, no drift, no adjustments, easily tunable for various engines, high noise immunity, and self test capability.

The broadband spectra signal 103 enters an analog-to-digital converter 401, for conversion from a continuous time analog signal 103 into a discrete time digital representation of the broadband spectra signal 403. Those skilled in the art will recognize many analog-to-digital converters suitable for the conversion. In FIG. 4 the remaining elements are emulated in microcoded software executed on a digital signal processor or DSP. In this case a Motorola DSP56001 device is used. The Motorola DSP56001 has the capability of executing over ten million instructions per second, and with 24 bit wide data paths provides 144 dB of dynamic range. Of course, those skilled in the art will recognize other equivalently useful DSP devices, or hardwired approaches vs. microcoded approaches.

The elements that follow are used to determine the average energy of the knock related spectra. Considering average energy is preferable, although not strictly required, because it further increases the accuracy of the detection system. This is done by discriminating between knock and noise signals, estimating average energy, and subtracting average noise energy from average knock energy.

Figure 5:
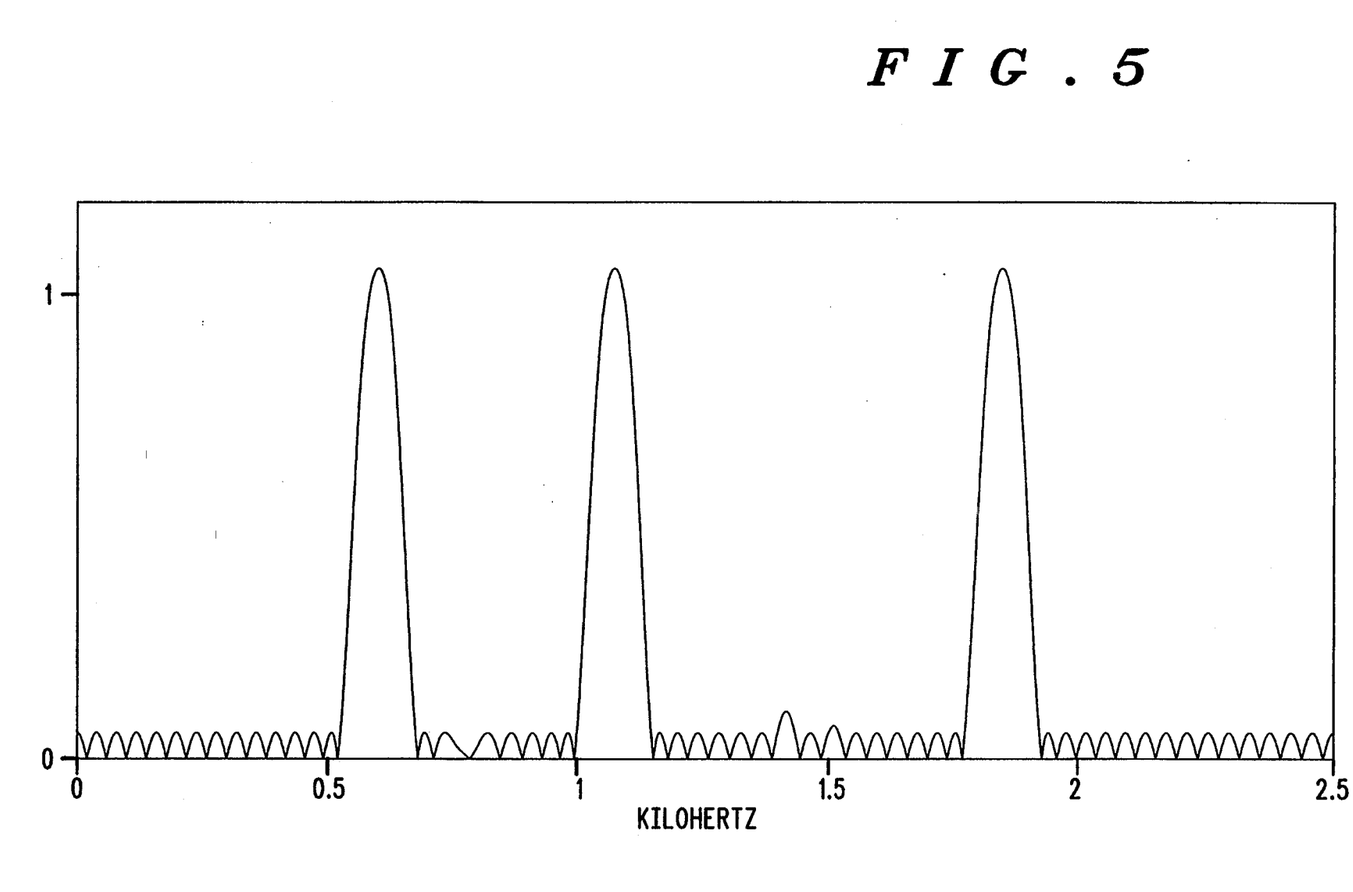
FIG. 5 is a chart showing a spectra plot representing the filtering characteristics of a knock spectra multiple bandpass infinite impulse response filter, as described in the preferred embodiment.
Figure 6:
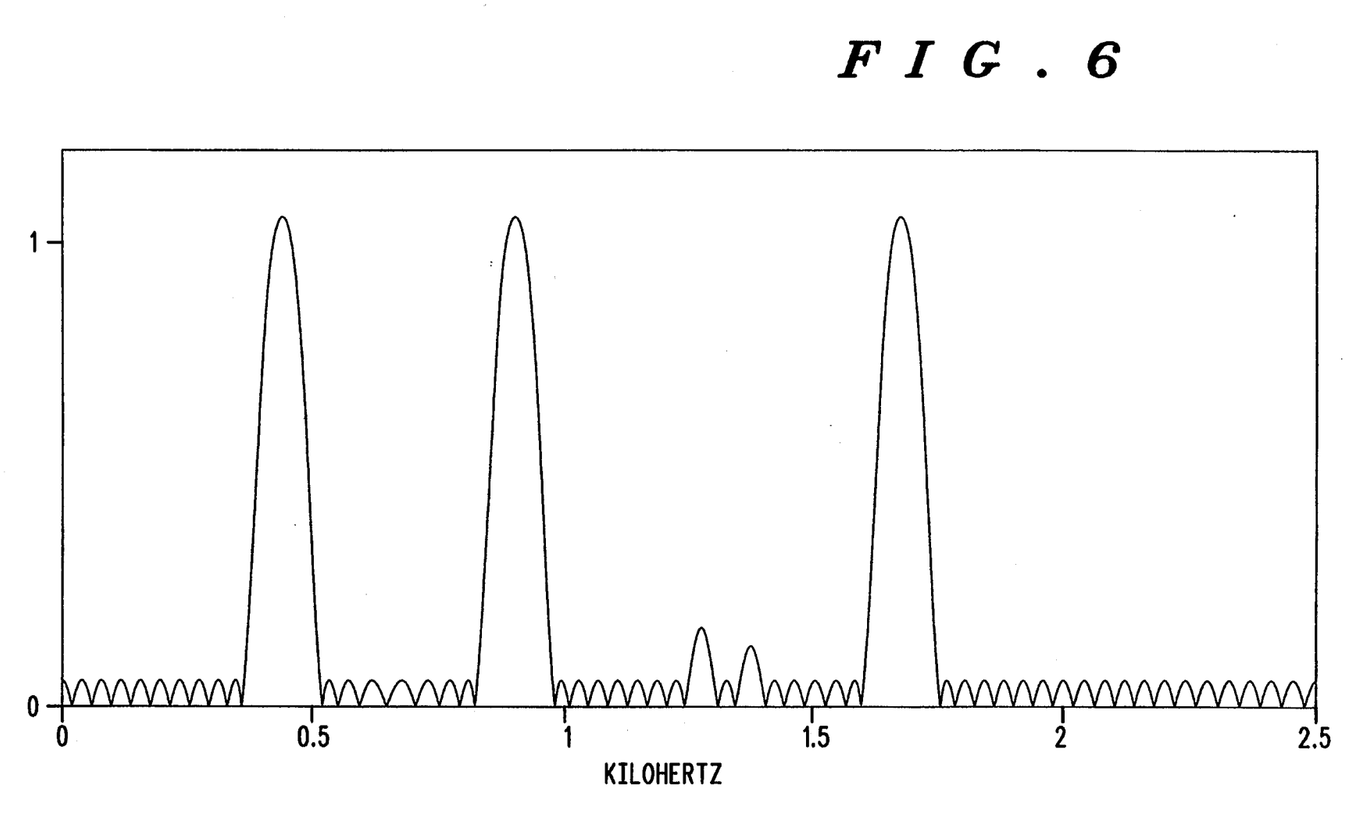
FIG. 6 is a chart showing a spectra plot representing the filtering characteristics of a noise spectra multiple bandpass infinite impulse response filter, as described in the preferred embodiment.

The analog-to-digital converter 401 provides the discrete time broadband spectra signal 403 both to a knock spectra multiple bandpass IIR, or infinite impulse response, filter 405 and a noise spectra multiple bandpass IIR filter 419. The knock spectra multiple bandpass filter 405 has a frequency response depicted in FIG. 5, and is pretuned to pass known knock mode frequencies, and to reject all other frequencies. The noise spectra multiple bandpass filter 417 has a frequency response depicted in FIG. 6, and is pretuned to pass a spectra adjacent to the known knock mode frequencies, and to reject all other frequencies. These filters, or frequency discrimination means, are tuned to extract narrowband spectra components from a broadband spectra. Note that the center frequencies of the respective multiple bandpass filters are interdigitated. This is because the noise occurring within the total bandwidth of the knock spectra, as delimited by the outermost knock filters, is determined by the noise filters located adjacently and within the knock spectra bandwidth. This is an important distinction over the prior art. Because of this arrangement knock can be more accurately determined.

As mentioned earlier, the Motorola DSP56001 device is programmed to emulate an IIR filter for filters 405 and 417. Of course, other filter configurations, such as a finite impulse response, or FIR filter may be used. The IIR filter was chosen because of its resource efficiency.

Figure 7:
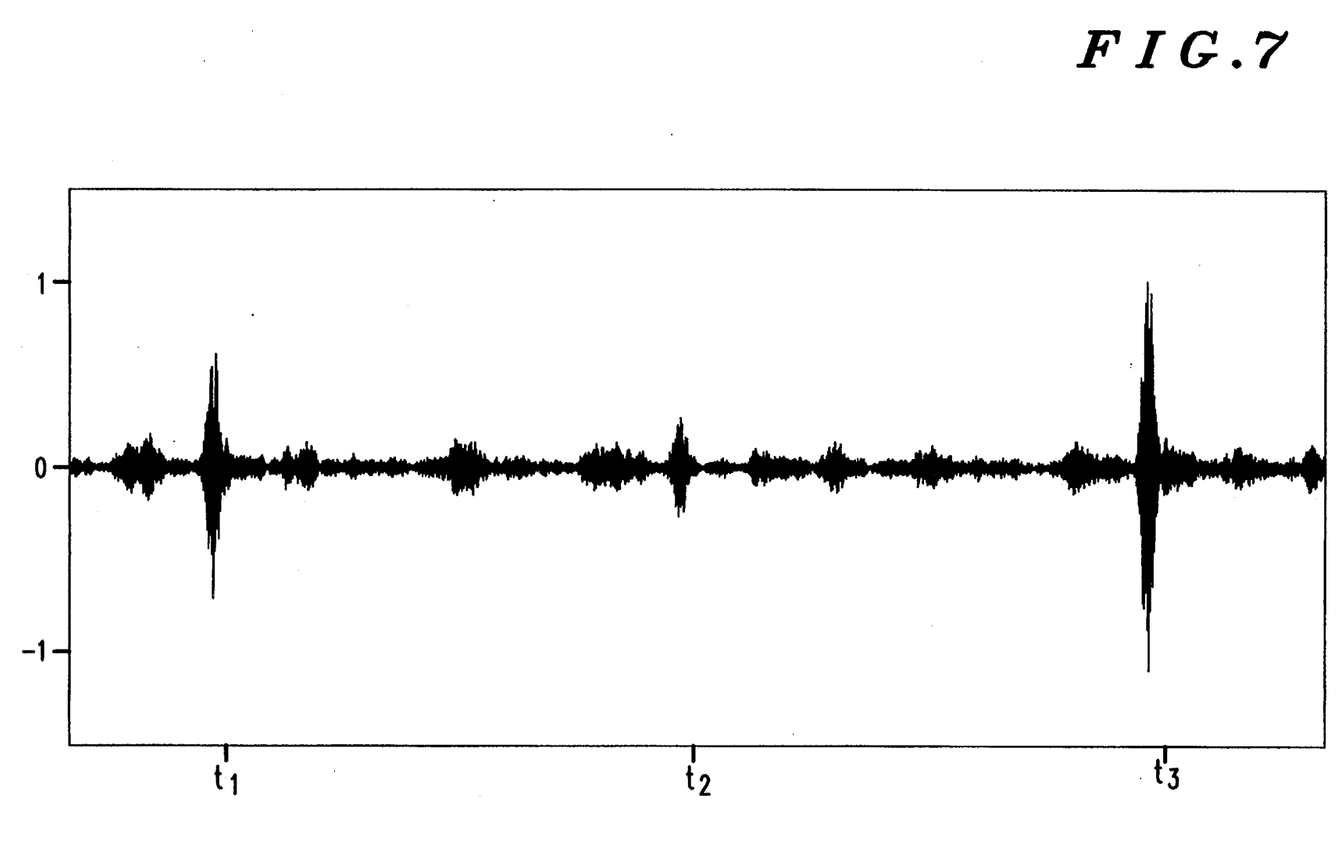
FIG. 7 is a chart showing a continuous time representation of a knock spectra signal output from a knock spectra multiple bandpass infinite impulse response filter, as described in the preferred embodiment.
Figure 8:
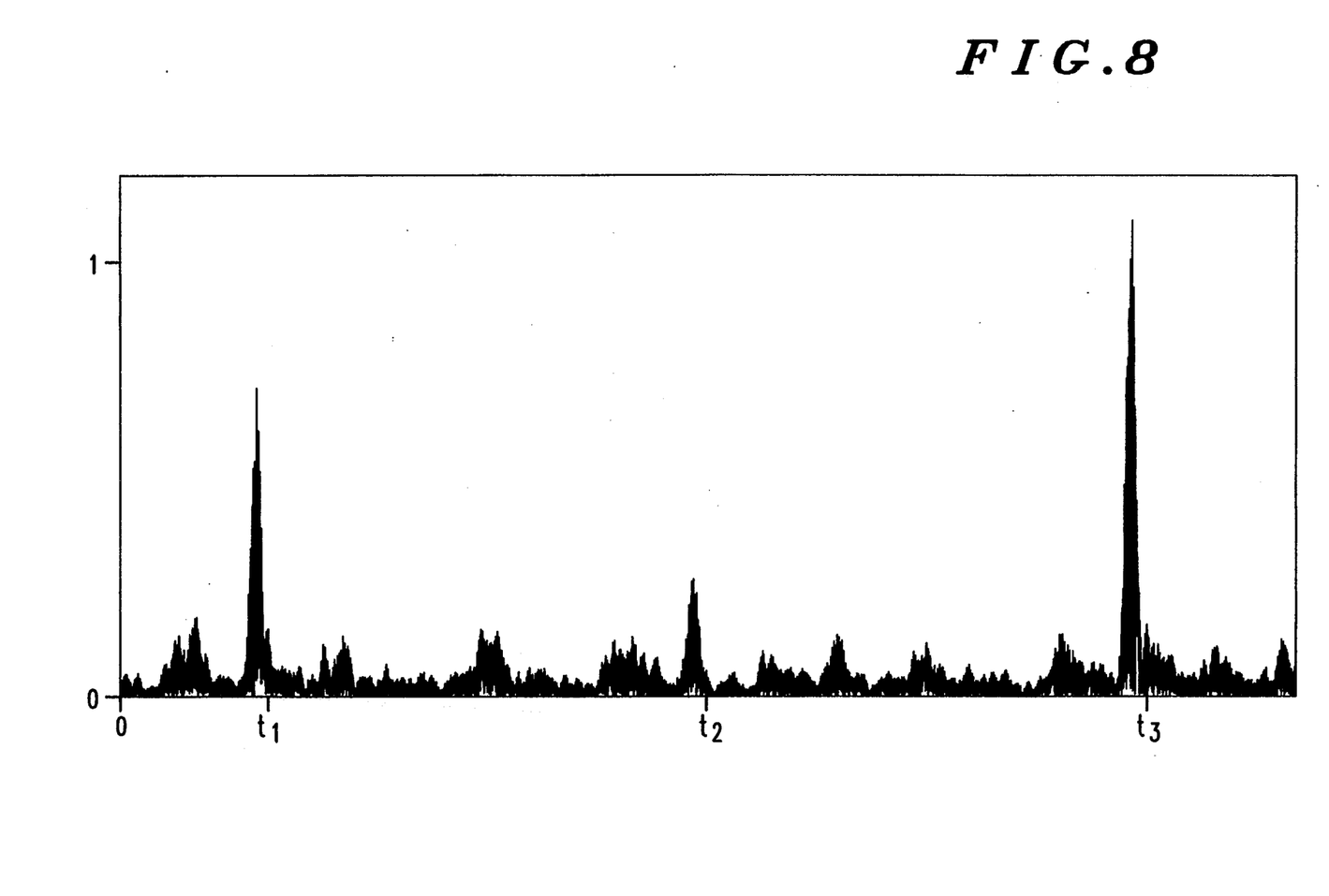
FIG. 8 is a chart showing a continuous time representation of an absolute knock spectra signal output from an absolute value element.
Figure 9:
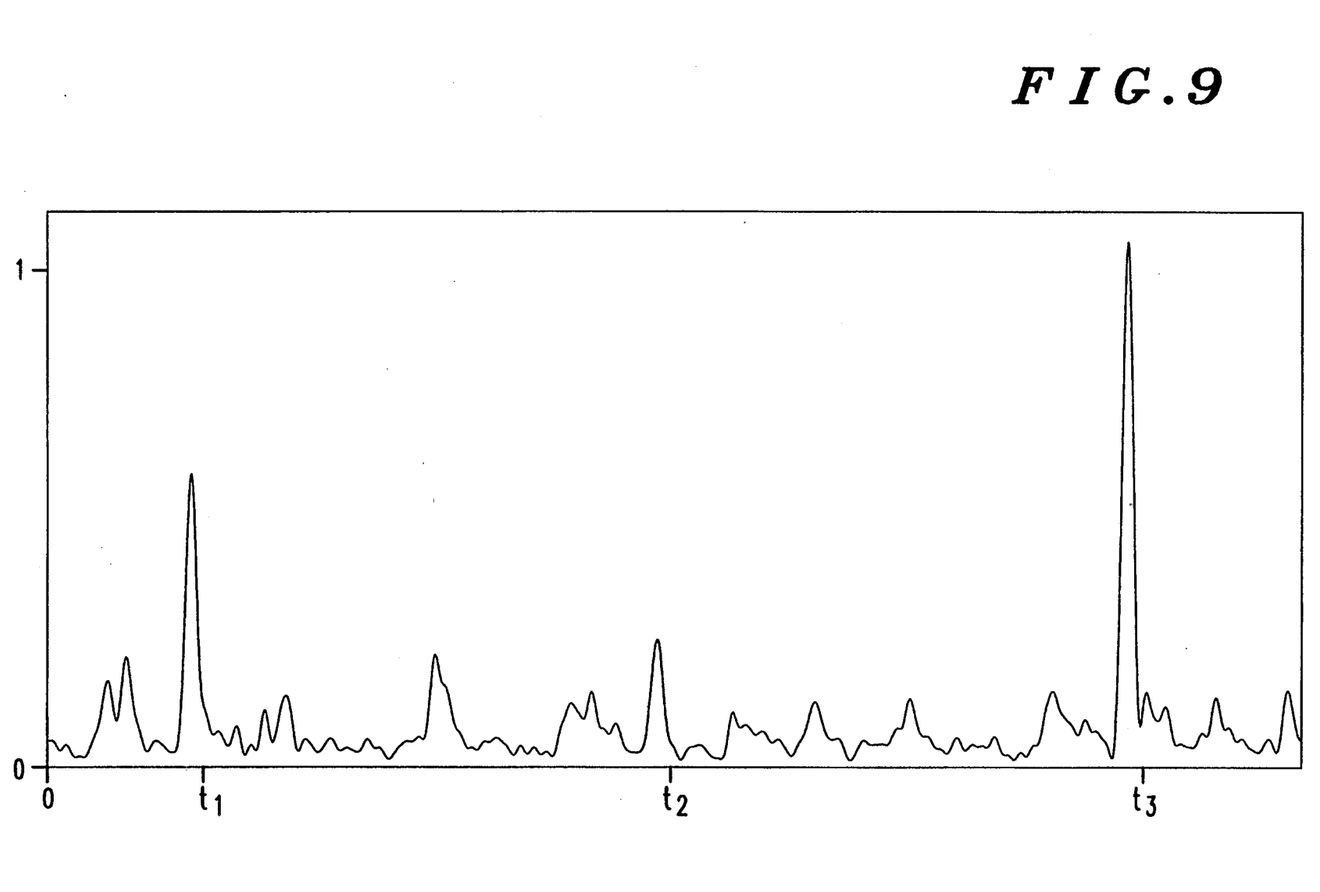
FIG. 9 is a chart showing a continuous time representation of an absolute average knock spectra signal output from an infinite impulse response lowpass filter.

The discrete time signal output from the knock multiple bandpass filter 405 is shown in FIG. 7, and represents a knock spectra signal 407. This knock spectra signal 407 is provided to an absolute value element 409. The transformation of the signal 407 to its absolute value is accomplished by a simple software instruction on the Motorola DSP56001. The result is an absolute knock spectra signal 411. This absolute knock spectra signal 411 is shown in FIG. 8. This is done to provide a DC level for average energy estimation. The absolute knock spectra signal 411 is provided to an IIR lowpass filter element 413. This filter 413 provides an average absolute knock spectra signal 415, representative of average energy within the absolute knock spectra signal 411. The average absolute knock spectra signal 415 is shown in FIG. 9. To reiterate, elements including the multiple bandpass IIR filter 405, the absolute value element 409, and the IIR lowpass filter element 413 together provide a knock discrimination means for providing a knock spectra signal representative of average energy within a predetermined knock spectra as extracted from the broadband spectra signal.

Figure 10:
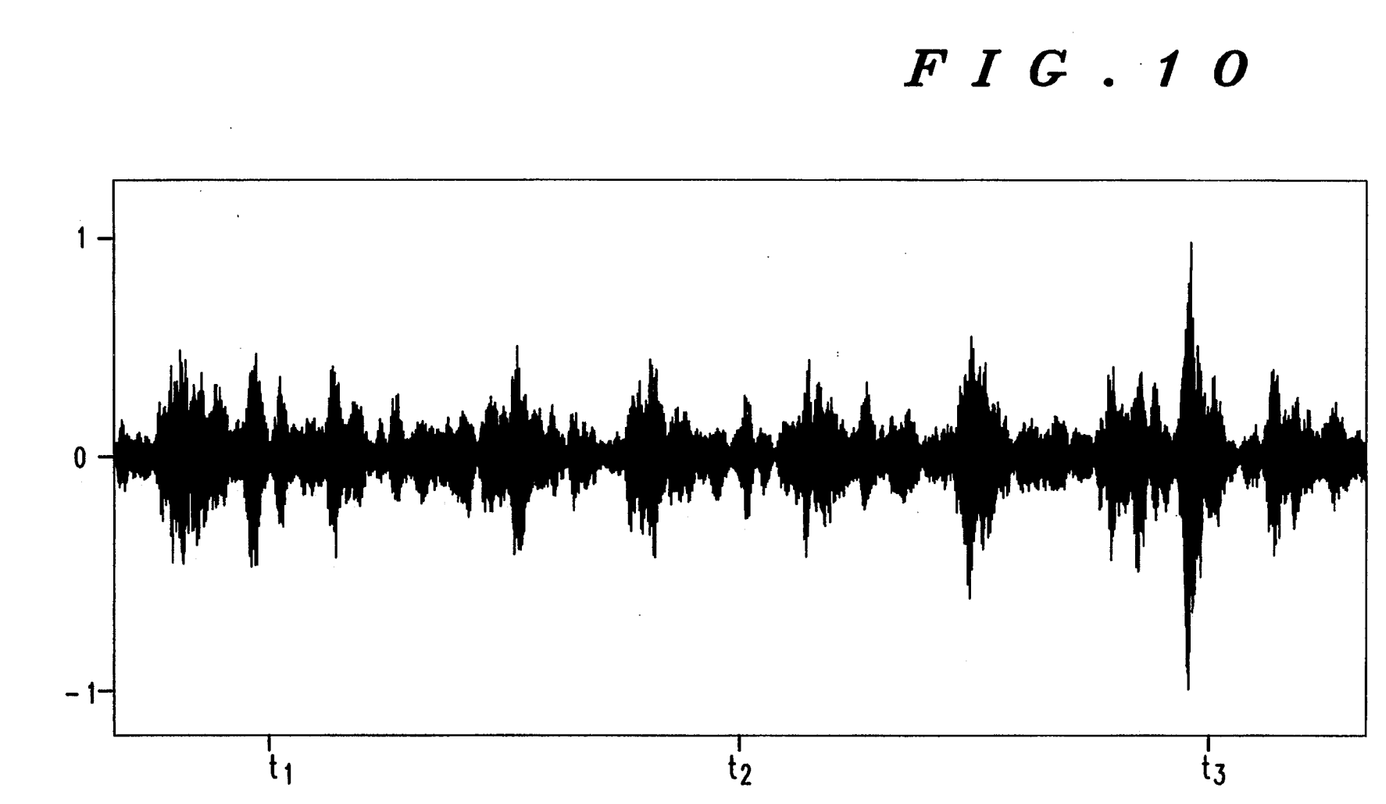
FIG. 10 is a chart showing a continuous time representation of a noise spectra signal output from a noise spectra multiple bandpass infinite impulse response filter, as described in the preferred embodiment.
Figure 11:
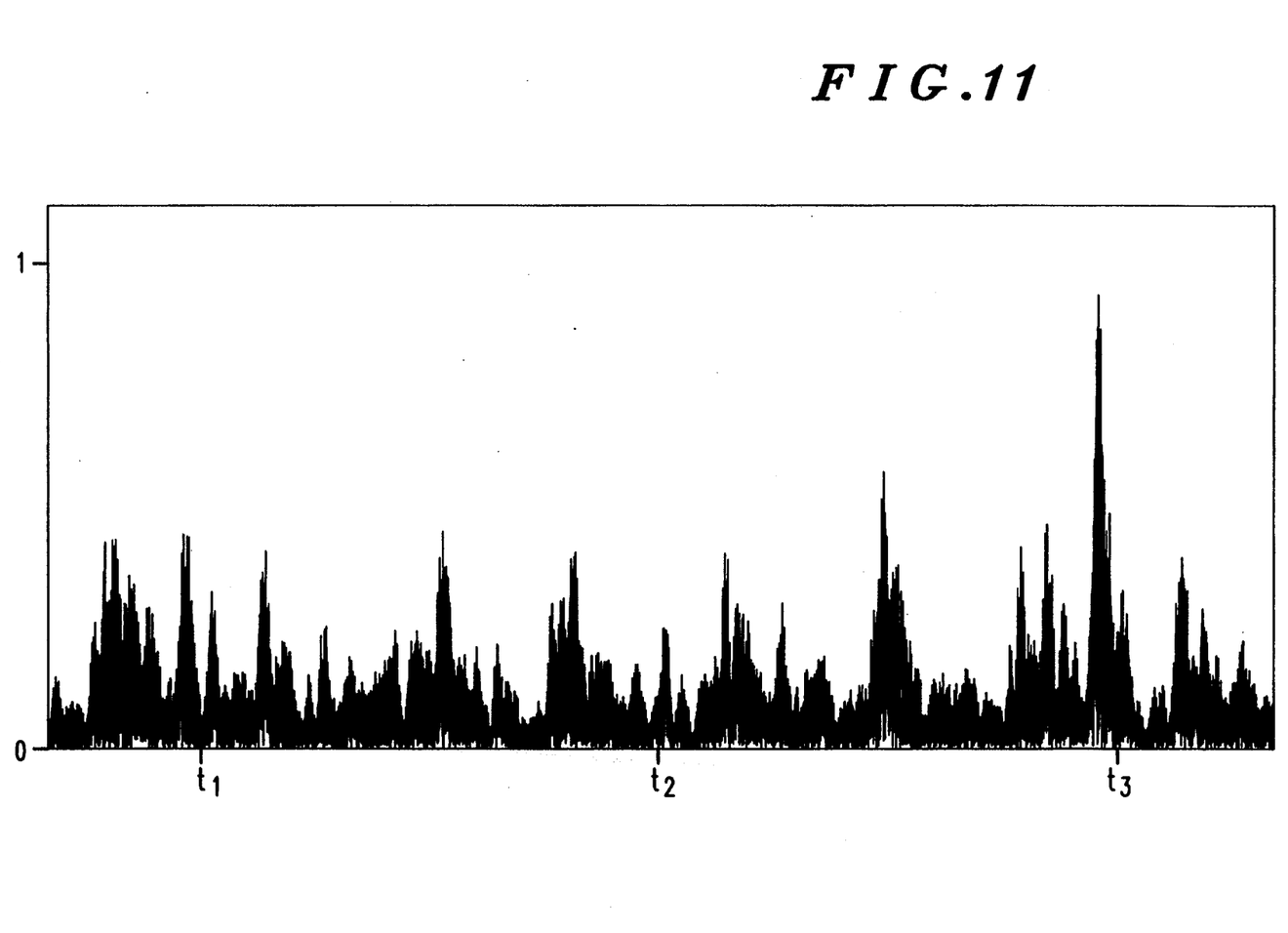
FIG. 11 is a chart showing a continuous time representation of an absolute noise spectra signal output from an absolute value element.
Figure 12:
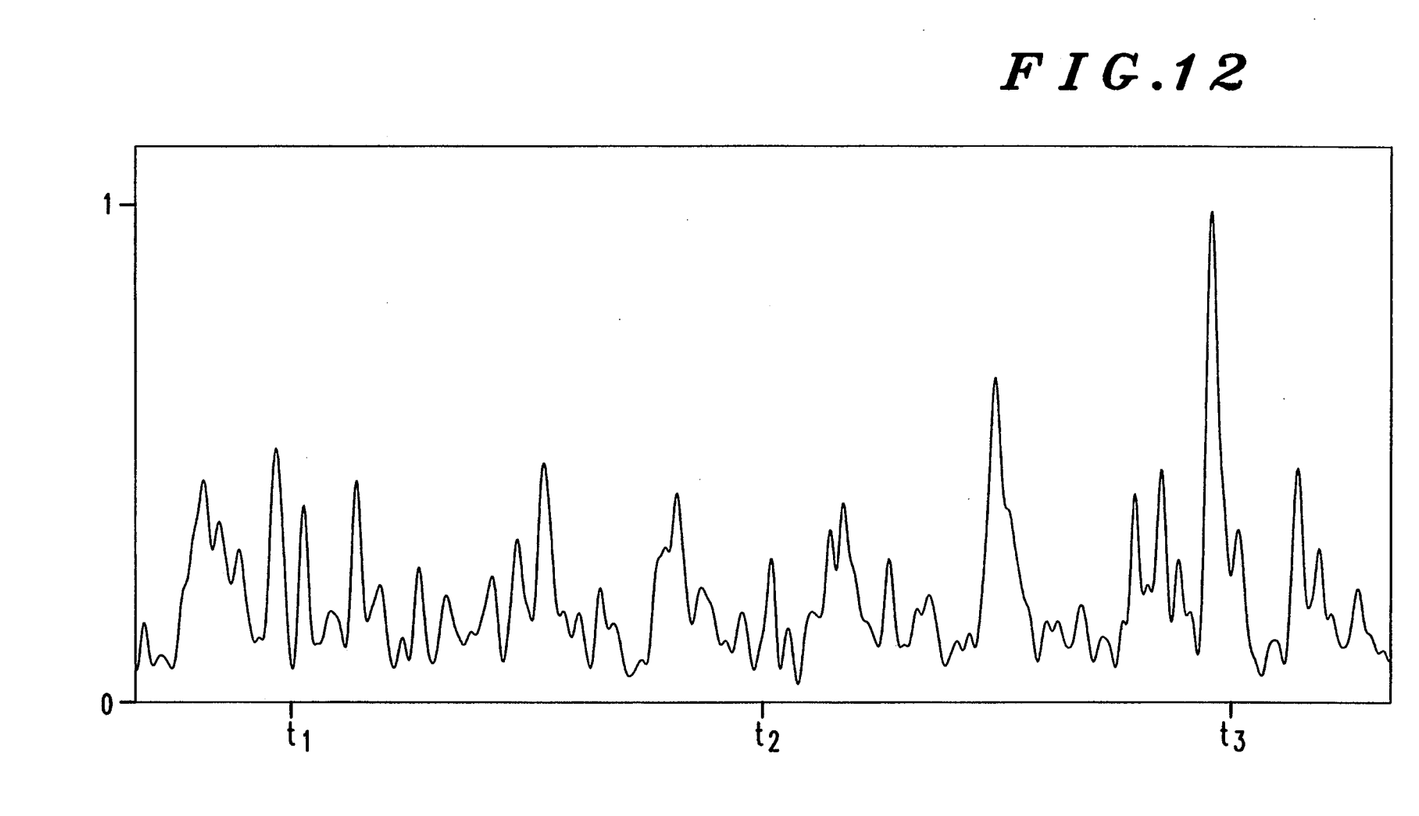
FIG. 12 is a chart showing a continuous time representation of an absolute average noise spectra signal output from, an infinite impulse response lowpass filter.

The discrete time signal output from the noise multiple bandpass filter 417 is shown in FIG. 10, and represents a noise spectra signal 419. This noise spectra signal 419 is provided to an absolute value element 421. The result from the absolute value instruction is an absolute noise spectra signal 423. This absolute noise spectra signal 423 is shown in FIG. 11. The absolute noise spectra signal 423 is provided to an IIR lowpass filter element 425. This filter 425 provides an average absolute noise spectra signal 427, representative of average energy within the absolute noise spectra signal 423. The average absolute noise spectra signal 427 is shown in FIG. 12. To reiterate, elements including the multiple bandpass IIR filter 417, the absolute value element 421, and the IIR lowpass filter element 425 together provide a noise discrimination means for providing a noise spectra signal representative of average energy within a predetermined noise spectra as extracted from the broadband spectra signal.

Figure 13:
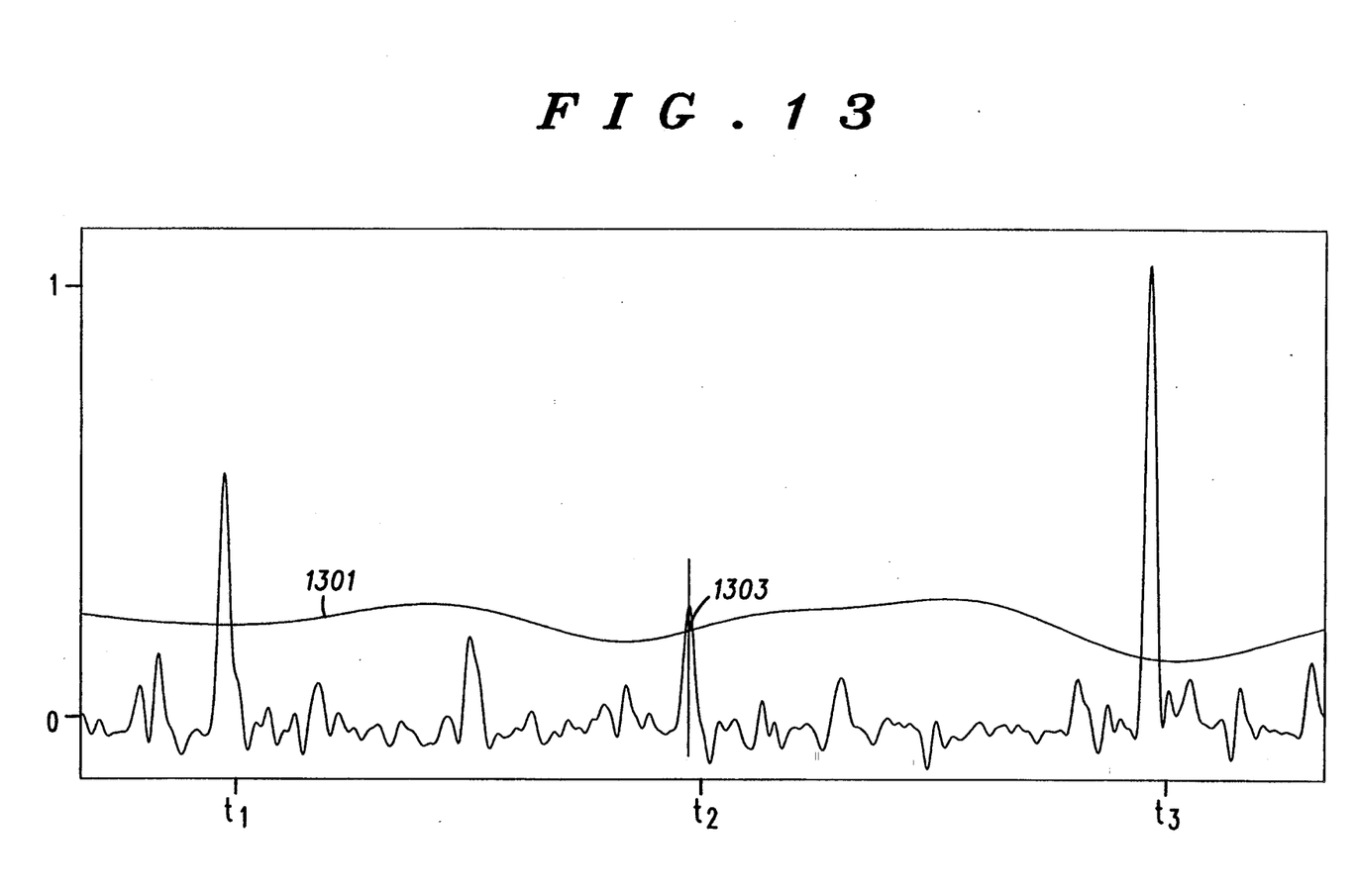
FIG. 13 is a chart showing a knock signal, as described in the preferred embodiment.

A combining, or summing element 429 subtracts the average noise energy, or average absolute noise spectra signal 427 from the average knock energy, or average absolute knock spectra signal 415. A knock signal 431 is provided at the output of this combining element 429. This knock signal 431 is shown in FIG. 13 and represents the knock information extracted from the broadband spectra signal 103.

The knock logic signal 107 is provided by comparing, with comparison element 453, the knock signal 431 with a threshold 451. This threshold may be fixed, or variable. In the simplest case it is a fixed value. A fixed threshold is shown in FIG. 13 as reference number 1301. In the Motorola DSP56001 this is represented by a binary number. In an analog system this may be a voltage.

With the system as described above a more accurate and reliable extraction of knock information, or the knock component of the broadband spectra, has been translated into the knock signal 431 and the knock logic signal 107.

A further improvement in accuracy and reliability can be attained by providing a proforma, variable threshold as follows.

The noise discrimination means 417, 421, and 425 provides a signal representative of average energy within the predetermined noise spectra, estimating the level of average noise energy in the noise spectra. Because of this estimation, the noise discrimination means may output a noise signal in excess of the actual average noise energy within the noise spectra. Because of this, after combination by element 429, the knock signal 431 may have a negative value, representing excess average noise energy. This negative value is directly representative of this phenomenon. To compensate for this phenomena additional signal processing is provided as follows.

Figure 14:
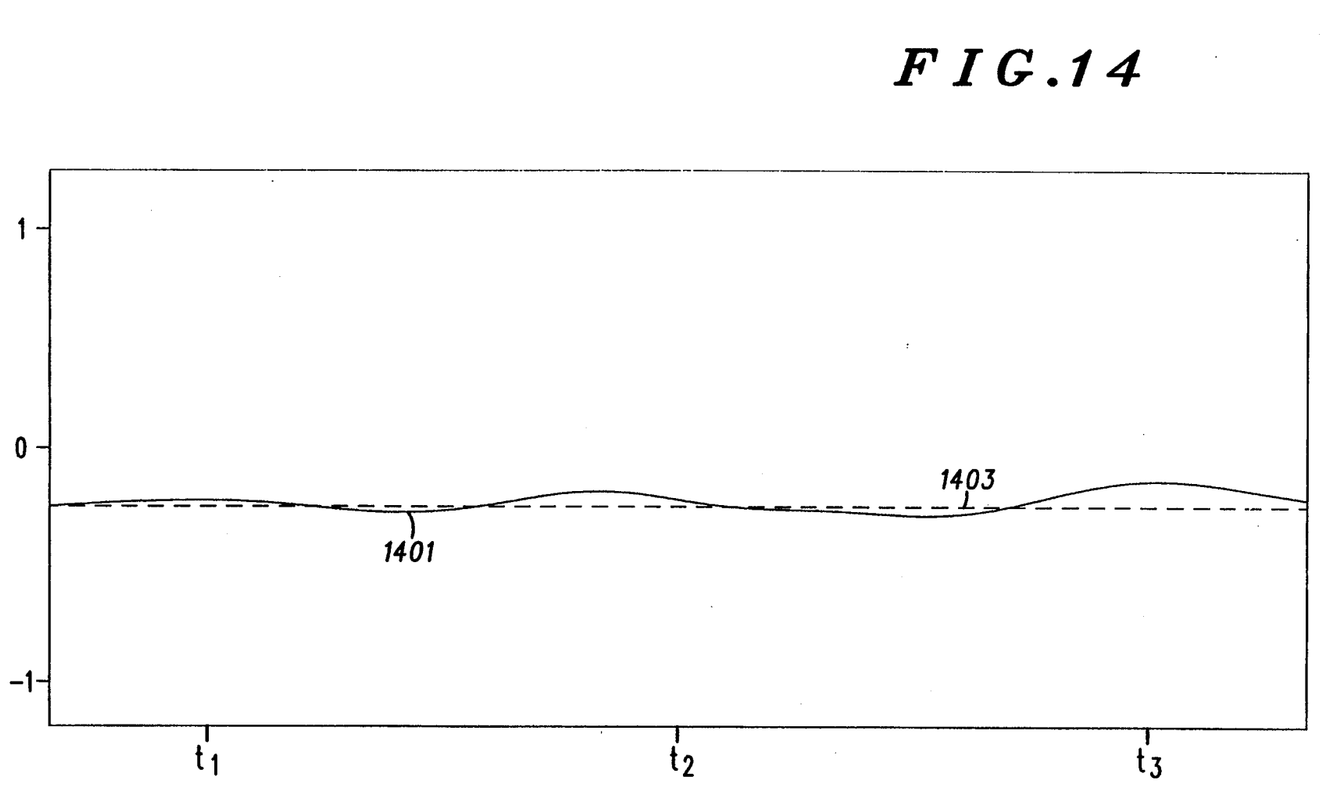
FIG. 14 is a chart showing an average negative knock-noise signal, used to derive a noise adaptive knock threshold.

The knock signal 431 is provided to an element 433 which in turn provides a negative knock-noise signal 435. This will extract only the excessive average noise energy from the knock signal 431. Next the negative knock-noise signal 435 is provided to an IIR lowpass filter 437. This IIR lowpass filter 437 provides an average negative knock-noise signal 439. FIG. 14 illustrates the average negative knock-noise signal 439. Reference number 1401 shows that the signal 439 changes about a reference line 1403 as the noise level changes. Next, this signal 439 is offset and scaled to provide an adaptive threshold. A summing means 443 provides an offset average negative knock-noise signal 445 responsive to a subtraction of a predetermine offset adjustment 441 from the average negative knock-noise signal 439. Then a scaling means 449 provides a knock threshold 451 by scaling the product of the offset average negative knock-noise signal 445 by a predetermined threshold multiplier 447. Finally, the knock logic signal 107 is derived from a comparison element 453 that generates a logical one signal responsive to receiving the knock signal 431 of a value greater than the knock threshold 451.

If desired, engine crank angle may be considered to window, or activate, this knock detection system for improved performance. Reference number 1303 in FIG. 13 shows the occurrence of top dead center or TDC for the engine crankshaft. Preferably, the window would be open from TDC to TDC+40 degrees.

In conclusion, an improved system for detecting the presence of a knock condition by interpreting a broadband spectra signal, in real time during a singular combustion event as measured from an internal combustion engine is described. The system is more reliable, and accurate, can detect knock at high engine speeds, requires minimum calibration and can be easily applied to different engine families.

What is claimed is:

1. An apparatus for detecting the presence of a knock condition by interpreting a broadband spectra signal provided by a spectra measurement device comprising:

knock discrimination means for providing an average absolute knock spectra signal representative of average energy within a predetermined knock spectra, extracted from the broadband spectra signal;

noise discrimination means for providing an average absolute noise spectra signal representative of average energy within a predetermined noise spectra, extracted from the broadband spectra signal;

summing means, coupled to the knock discrimination means for receiving the knock spectra signal, and coupled to the noise discrimination means for receiving the noise spectra signal, said summing means for providing a knock signal representative of a subtraction of the average absolute noise spectra signal from the average absolute knock spectra signal;

means for providing a negative knock-noise signal representing a negative portion of the knock signal; and comparison means for providing a knock logic signal responsive to a comparison between the knock signal and the negative knock-noise signal.

2. An apparatus in accordance with claim 1 further comprising:

offset adjustment means, for providing an offset conditioned knock-noise signal, representative of a summation of an offset adjustment and the negative knock-noise signal; and wherein said comparison means provides the knock logic signal responsive to a comparison between the knock signal and the offset conditioned knock-noise signal.

3. An apparatus in accordance with claim 1 wherein said knock discrimination means comprises means for determining more than one knock spectral component from said broadband spectra signal and for providing an average absolute knock spectra signal representative of average energy within a predetermined knock spectra dependent on the more than one knock spectral component.

4. An apparatus in accordance with claim 1 wherein said noise discrimination means comprises means for determining more than one noise spectral component from said broadband spectra signal and for providing an average absolute noise spectra signal representative of average energy within a predetermined noise spectra dependent on the more than one noise spectral component.

5. An apparatus in accordance with claim 1 wherein said comparison means provides a knock logic signal when a magnitude of the knock signal exceeds a magnitude of the negative knock-noise signal.

6. An apparatus in accordance with claim 2 further comprising a threshold multiplier means, for providing a scaled offset conditioned knock-noise signal, representative of a product of the offset conditioned knock-noise signal and a threshold multiplier; and
   wherein said comparison means provides the knock logic signal responsive to a comparison between the knock signal and the scaled offset conditioned knock-noise signal.

7. An apparatus for detecting the presence of a knock condition by interpreting a broadband spectra signal provided by a spectra measurement device comprising:
   knock discrimination means, comprising a knock multiple bandpass filter, tuned to a predetermined spectra, for providing a knock spectra signal representative of signal present within a predetermined knock spectra of the broadband spectra signal;
   noise discrimination means, comprising a noise multiple bandpass filter, tuned to a predetermined spectra located apart and interdigitated with the knock multiple bandpass filter, for providing a noise spectra signal representative of signal present within a predetermined noise spectra of the broadband spectra signal;
   knock absolute value determining means for providing an absolute knock spectra signal representative of an absolute value of the signal present within the knock spectra signal;
   noise absolute value determining means for providing an absolute noise spectra signal representative of an absolute value of the signal present within the noise spectra signal;
   knock averaging means for providing an average absolute knock spectra signal representative of average energy within the absolute knock spectra signal;
   noise averaging means for providing an average absolute noise spectra signal representative of average energy within the absolute noise spectra signal;
   summing means for providing a knock signal representative of a subtraction of the average absolute noise spectra signal from the average absolute knock spectra signal;
   negative determining means for providing a negative knock-noise signal responsive to the knock signal;
   knock-noise averaging means for providing an average negative knock-noise signal responsive to the negative knock-noise signal;
   summing means for providing an offset average negative knock-noise signal responsive to a subtraction of a predetermined offset adjustment from the average negative knock-noise signal; and
   scaling means for providing a knock threshold responsive to scaling the offset average negative knock-noise signal by a predetermined threshold multiplier; and
   comparison means for providing a knock logic signal responsive to comparing the knock signal to the knock threshold.

8. An apparatus in accordance with claim 7 wherein said negative determining means comprises a half wave rectifier.

* * * * *